US012505712B1

(12) United States Patent
Greenbaum et al.

(10) Patent No.: US 12,505,712 B1
(45) Date of Patent: Dec. 23, 2025

(54) CONTAINER CLOSURE SYSTEMS AND METHODS HAVING ASSOCIATED STATE IDENTIFIERS

(71) Applicant: Amazon Technologies, Inc., Seattle, WA (US)

(72) Inventors: Adam Joseph Greenbaum, Boston, MA (US); Stephen Charles Paschall, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 834 days.

(21) Appl. No.: 17/208,739

(22) Filed: Mar. 22, 2021

(51) Int. Cl.
*G07C 9/00* (2020.01)
*B62B 3/00* (2006.01)
*B62B 5/00* (2006.01)
*B65D 55/10* (2006.01)
*E05C 1/04* (2006.01)
*E05C 3/04* (2006.01)
*E05C 19/08* (2006.01)

(52) U.S. Cl.
CPC .......... *G07C 9/00714* (2013.01); *B62B 3/004* (2013.01); *B62B 5/0026* (2013.01); *B65D 55/10* (2013.01); *E05C 1/04* (2013.01); *E05C 3/041* (2013.01); *E05C 19/08* (2013.01)

(58) Field of Classification Search
CPC ....... B62B 3/004; B62B 5/0026; B62B 55/10; G07C 9/00714; E05C 1/04; E05C 3/041; E05C 19/08
USPC ...................................................... 280/47.34
See application file for complete search history.

(56) References Cited

U.S. PATENT DOCUMENTS

| 4,822,085 | A | * | 4/1989 | Guity-Mehr | E05C 19/16 335/295 |
| 5,551,773 | A | * | 9/1996 | Cottrell | B25H 1/12 242/129 |
| 7,516,843 | B2 | * | 4/2009 | Konop | B65D 73/0035 206/349 |
| 7,556,271 | B2 | * | 7/2009 | Robbins | H05K 7/183 280/47.35 |
| 8,317,674 | B2 | * | 11/2012 | Quirico | A61M 5/14 600/5 |
| 10,850,757 | B1 | * | 12/2020 | Curlee | B62B 3/003 |
| 2006/0071437 | A1 | * | 4/2006 | Blasco | B65D 25/005 280/79.2 |
| 2008/0252084 | A1 | * | 10/2008 | Francis | G09F 3/0376 700/226 |
| 2009/0322510 | A1 | * | 12/2009 | Berger | H04W 60/00 340/568.1 |
| 2012/0273438 | A1 | * | 11/2012 | Nordin | H05K 7/1491 211/26 |
| 2014/0085087 | A1 | * | 3/2014 | Alnadwi | G07C 9/20 340/5.32 |

(Continued)

*Primary Examiner* — Hau V Phan
(74) *Attorney, Agent, or Firm* — Athorus, PLLC

(57) ABSTRACT

Container closure systems may include various types of latches to secure doors. The latches may present one or more state identifiers, such as open state identifiers and closed state identifiers. Different state identifiers may be presented and scannable based on a state of the door and latch. For example, an open state identifier may be presented and scannable if a door is open and unlocked, and a closed state identifier may be presented and scannable if a door is closed and locked. By scanning and identifying the state identifiers, safe and efficient operations of containers may be facilitated.

14 Claims, 10 Drawing Sheets

(56) References Cited

U.S. PATENT DOCUMENTS

| | | | |
|---|---|---|---|
| 2017/0257969 A1* | 9/2017 | Kuan | E05B 65/46 |
| 2019/0030109 A1* | 1/2019 | Sharma | A61K 36/48 |
| 2019/0039734 A1* | 2/2019 | Shah | G09F 21/00 |
| 2020/0312073 A1* | 10/2020 | Ivarson | E05B 47/0001 |

* cited by examiner

CONTAINER CLOSURE SYSTEMS AND METHODS HAVING ASSOCIATED STATE IDENTIFIERS

BACKGROUND

Containers, carts, and other movable material handling equipment in material handling facilities or other industrial facilities may include one or more doors or closures to facilitate loading, unloading, transport, and other operations using such carts and equipment. Generally, the doors and closures may move between open and closed positions. However, if, for example, the doors and closures are in the open position while the carts are being transported, one or more items or objects within the cart may fall out and potentially cause damage or injuries, while also creating inefficiencies in operations. Accordingly, there is a need for carts with doors and closures having state identifiers to simply and reliably ensure safe and efficient operations and processes within material handling facilities.

DETAILED DESCRIPTION

Figure 1:
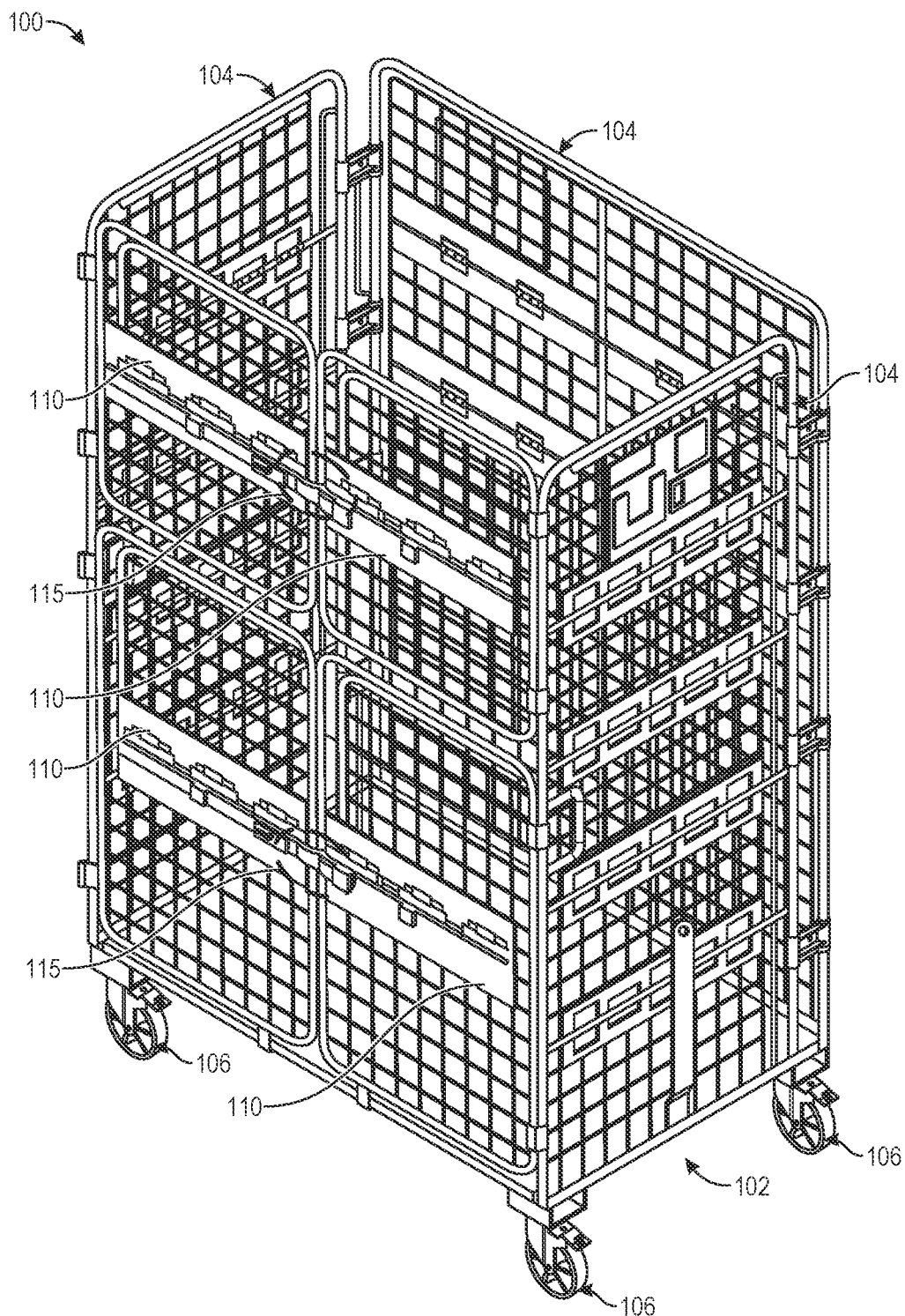
FIG. 1 is a schematic diagram of an example cart having doors or closures, in accordance with implementations of the present disclosure.

As is set forth in greater detail below, implementations of the present disclosure are directed to cart closure systems having associated state identifiers to safely and reliably indicate whether a cart door is in a closed position or an open position, and associated methods of using such cart closure systems.

For example, a cart may carry or contain one or more items or objects, and the cart may include one or more doors. The doors may move to open positions to receive or remove items, and the doors may move to closed positions to retain, secure, and/or transport items. In addition, the doors may include various types of latches that move between unlocked positions, in which the doors may be moved to the open positions, and locked positions, in which the doors may be maintained in the closed positions. The latches may physically secure the doors in the closed positions using various structural elements or features described herein.

Further, the latches may include one or more state identifiers to indicate whether a door is in a closed position or an open position, and/or whether a latch is in a locked position or an unlocked position. In example embodiments, the state identifiers may include closed state identifiers that are visible and/or scannable responsive to the door being in the closed position and/or the latch being in the locked position. In additional example embodiments, the state identifiers may include open state identifiers that are visible and/or scannable responsive to the door being in the open position and/or the latch being in the unlocked position.

Using such state identifiers to indicate open/closed states of doors and/or locked/unlocked states of latches, safe and efficient operations of the carts may be more reliably performed. In example embodiments, the cart closure systems having associated state identifiers may enable various operations, such as loading, transport, or unloading operations of the carts, to be safely and efficiently performed by human agents. In additional example embodiments, the cart closure systems having associated state identifiers may enable various operations, such as loading, transport, or unloading operations of the carts, to be safely and efficiently performed by automated or robotic agents, such as robotic drive units, automated movement apparatus, or other machinery, equipment, or automation.

Although the description herein is generally directed to carts having associated closure systems, the various example embodiments described herein may be applied to various types of industrial processes or environments that may utilize various types of containers or enclosures having doors, lids, covers, or other closure systems. For example, the various types of containers or enclosures may include carts, bins, totes, boxes, receptacles, shipping containers, freight containers, rooms, chambers, workstations, work cells, vehicles, autonomous vehicles, or other types of containers or enclosures having closure systems. Further, the various example embodiments described herein may be applied to further varied environments utilizing containers, enclosures, transport equipment or devices, vehicles, autonomous vehicles, people movers, amusement rides, or other types of transport machinery or systems having associated closure systems.

FIG. 1 is a schematic diagram 100 of an example cart having doors or closures, in accordance with implementations of the present disclosure.

The example cart of FIG. 1 may include a base 102, a frame 104 including one or more sides, one or more rollers or wheels 106, one or more doors or closures 110, and one or more latches 115 associated with the doors 110.

The base 102 and frame 104 may be coupled together to form a container, enclosure, or other at least partially enclosed volume of the cart that is configured to receive, carry, and/or transport one or more items or objects. In addition, the cart may include one or more shelves or levels coupled or placed within the base 102 and frame 104 that are configured to receive, carry, and/or transport one or more items or objects. The base 102, frame 104, and/or shelves may be formed of sheets, plates, wireframes, beams, or other structural elements, and the base 102, frame 104, and/or shelves may be formed of various materials, such as metals, wood, plastics, composites, other materials, or combinations thereof. The various portions of the base 102, frame 104, and/or shelves described herein may be coupled together via fasteners, adhesives, welds, or other types of connectors.

The various types of items or objects may include books, electronics, clothing, housewares, office equipment, food, drinks, or any other types of objects that may be received, carried, and/or transported by the cart.

The rollers or wheels 106 may be coupled to the base 102 of the cart and enable movement of the cart within a facility, such as a material handling facility, warehouse, distribution center, sortation center, wholesale or retail facility, grocery store, or any other facility or environment. In example embodiments, the cart may be moved by human agents, robotic drive units, or other automated movement apparatus. For example, a human agent may push or pull the cart on its wheels 106 along a floor surface. In addition, a robotic drive unit may drive adjacent or under the cart, couple to a portion of the base 102 or frame 104, and then move the cart either by pushing or pulling the cart on its wheels 106 or by lifting and carrying the cart. The wheels 106 described herein may be coupled to various portions of the base 102 and/or frame 104 via fasteners, adhesives, welds, or other types of connectors.

The doors 110 may be movably and/or rotatably coupled to the frame 104 of the cart. For example, the doors 110 may be coupled to the frame 104 via one or more hinges. The doors 110 may move between open positions and closed positions. The doors 110 may be formed of sheets, plates, wireframes, beams, or other structural elements, and the doors 110 may be formed of various materials, such as metals, wood, plastics, composites, other materials, or combinations thereof. In example embodiments, a cart may include a single door 110 that moves between open and closed positions. In other example embodiments, a cart may include two doors 110 that open out and away from each other, and that close in and toward each other, e.g., double doors. In other example embodiments, a cart may include various other numbers, configurations, or arrangements of doors 110. The various portions of the doors 110 described herein may be coupled together via fasteners, adhesives, welds, or other types of connectors.

Further, one or more latches 115 may be associated with or at least partially movably coupled to the doors 110 and/or frame 104. The latches 115 may move between unlocked positions and locked positions. The latches 115 may comprise various types, such as fork latches, bar latches, post latches, gravity latches, bolt latches, sliding bolt latches, flip or pivot latches, double door arm latches, butterfly latches, double butterfly latches, or other types of latches. In addition, the latches 115 may be formed of various materials, such as metals, wood, plastics, composites, other materials, or combinations thereof.

In example embodiments, although the description herein generally describes that portions of latches 115 are coupled to doors of carts, any of the example embodiments described herein may include one or more portions of latches 115 that are associated with doors of carts, and/or one or more other portions of latches 115 that are associated with portions of frames of carts. For example, various portions of the example door latches 115 described herein may be coupled to portions of two doors 110 that open out and away from each other, e.g., double doors. In other example embodiments, various portions of the example door latches 115 described herein may be coupled to portions of a door 110 and portions of a frame 104, e.g., a cart having a single door. The various portions of the example door latches 115 described herein may be coupled to portions of doors 110 and/or frames 104 via fasteners, adhesives, welds, or other types of connectors.

The example carts may be used to receive, carry, and/or transport items within various types of facilities. The cart closure systems having associated state identifiers described herein may be incorporated into and used with the example carts shown in FIG. 1, and/or with various other types, shapes, sizes, or configurations of carts, containers, enclosures, or other apparatus or systems having one or more doors or closures. Using the cart closure systems having associated state identifiers described herein, various operations, such as loading, transport, or unloading operations of the carts, may be safely and efficiently performed by human agents and/or automated or robotic agents, such as robotic drive units, automated movement apparatus, or other machinery, equipment, or automation.

Figure 2A:
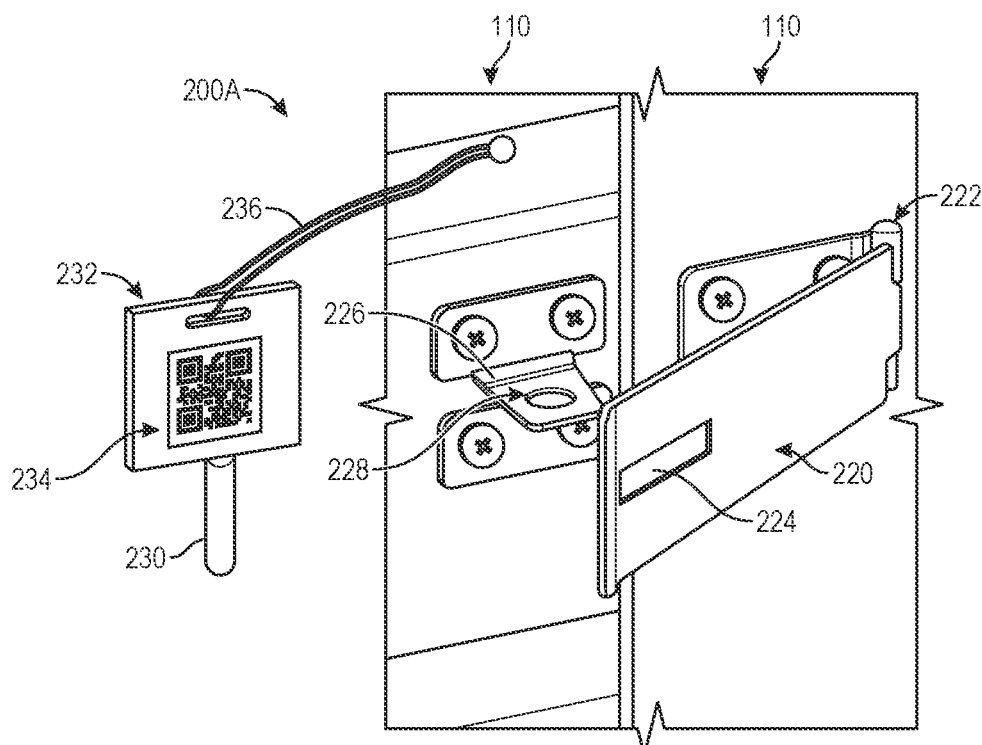
FIG. 2A is a schematic diagram of a first example door latch having state identifiers in an open position, in accordance with implementations of the present disclosure.
Figure 2B:
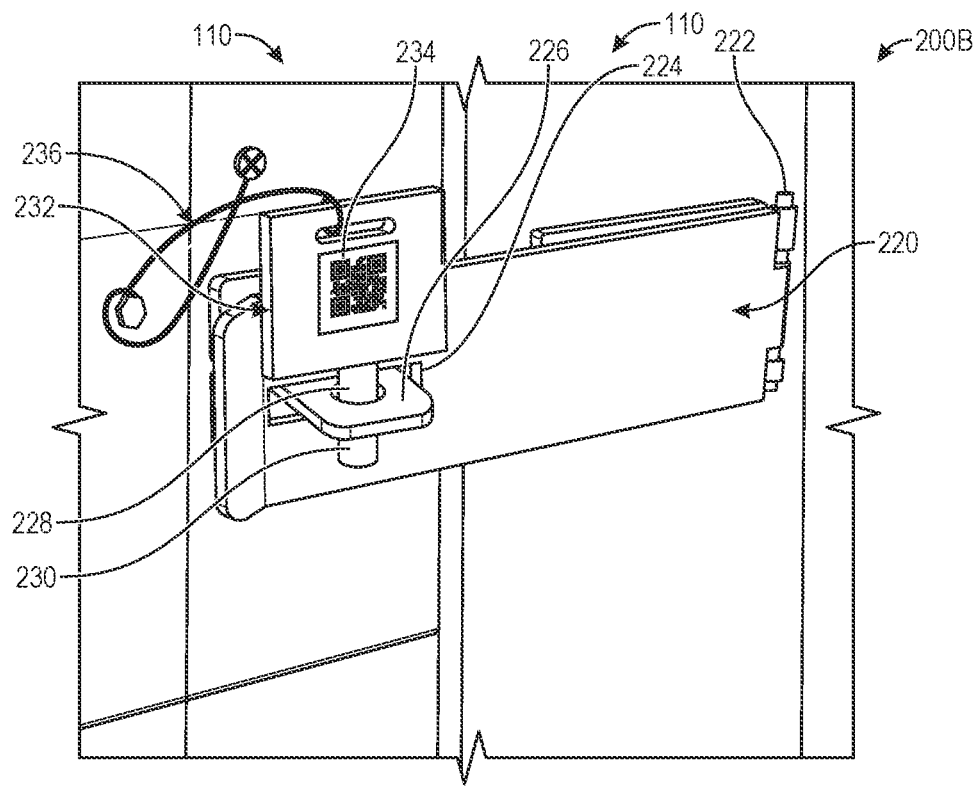
FIG. 2B is a schematic diagram of the first example door latch having state identifiers in a closed position, in accordance with implementations of the present disclosure.

FIG. 2A is a schematic diagram 200A of a first example door latch having state identifiers in an open position, in accordance with implementations of the present disclosure, and FIG. 2B is a schematic diagram 200B of the first example door latch having state identifiers in a closed position, in accordance with implementations of the present disclosure.

The first example door latch may include a hasp 220 having a slot 224 that is movably coupled to a portion of a door 110 via a hinge 222. The hasp 220 may comprise a sheet, plate, beam, or other bent, formed, or shaped material, and the hasp 220 may be formed of various materials, such as metals, wood, plastics, composites, other materials, or combinations thereof. The hasp 220 may rotate substantially freely via the hinge 222 between an open position, as partially shown in FIG. 2A, and a closed position, as shown in FIG. 2B.

In addition, the latch may include a loop 226 having a hole or slot 228 that is coupled to a portion of another door 110. The loop 226 may comprise a sheet, plate, beam, or other bent, formed, or shaped material, and the loop 226 may be formed of various materials, such as metals, wood, plastics, composites, other materials, or combinations thereof. When the hasp 220 is in the open position, as partially shown in FIG. 2A, the hasp 220 may be freely movable relative to the loop 226, and/or the loop 226 may be substantially removed from the slot 224 of the hasp 220. Further, when the hasp 220 is in the closed position, as shown in FIG. 2B, the loop 226 may be substantially inserted into the slot 224 of the hasp 220.

Further, the latch may include a pin 230 and identifier plate 232 that is attached to a portion of a door via a wire or string 236, and the pin 230 may be configured to be inserted into the hole or slot 228 of the loop 226. The pin 230 and identifier plate 232 may comprise a sheet, plate, beam, rod, or other bent, formed, or shaped material, and the pin 230 and identifier plate 232 may be formed of various materials, such as metals, wood, plastics, composites, other materials, or combinations thereof. In addition, the pin 230 and identifier plate 232 may be captured or retained relative to the cart by attachment via the wire or string 236. Further, the identifier plate 232 may include a state identifier or code 234 to indicate a state of a door and latch, e.g., a closed state. The state identifier or code 234 may comprise a symbol, character, number, text, color, pattern, barcode, quick response (QR) code, or any other type of identifier or code, and the state identifier 234 may comprise human-readable, machine-readable, and/or computer-readable identifiers or codes.

When the hasp 220 is in the open position, as partially shown in FIG. 2A, the pin 230 and identifier plate 232 may be substantially removed from the hole 228 of the loop 226, and the first example door latch may be in the unlocked position. In this open and unlocked position, although the pin 230 and identifier plate 232 remain attached to or retained relative to the cart by the wire or string 236, the state identifier 234 may not be readily or easily imaged or scanned, e.g., by an imaging device or a scanning device. In this manner, scanning of the state identifier 234 may be more difficult in the open and unlocked position, thereby substantially preventing movement or transfer of the cart while the door and latch are in the open and unlocked position.

Further, when the hasp 220 is in the closed position, as shown in FIG. 2B, the pin 230 and identifier plate 232 may be substantially inserted into the hole 228 of the loop 226, and the first example door latch may be in the locked position. In this closed and locked position, the pin 230 and identifier plate 232 may be positioned and oriented relative to the door and/or frame, such that the state identifier 234 may be readily or easily imaged or scanned, e.g., by an imaging device or a scanning device. In this manner, scanning of the state identifier 234 may be facilitated in the closed and locked position, thereby enabling movement or transfer of the cart while the door and latch are in the closed and locked position.

In additional example embodiments, the state identifier 234, e.g., the closed state identifier, may be provided on both or multiple sides of the identifier plate 232, in order to further facilitate scanning of the state identifier 234 in the closed and locked position regardless of the particular orientation of insertion of the pin 230 and identifier plate 232 into the hole 228 of the loop 226.

In further example embodiments, a first portion of the state identifier 234 may be provided on the identifier plate 232, and a second portion of the state identifier 234 may be provided on a door or frame adjacent an inserted position of the pin 230 and identifier plate 232. In this manner, the state identifier 234 may not be properly imaged or scanned unless the first portion of the state identifier 234 on the identifier plate 232 and the second portion of the state identifier 234 on the door or frame are correctly aligned with each other. In this manner, scanning of the state identifier 234 without inserting the pin 230 and identifier plate 232 into the hole 228 of the loop 226 may be substantially prevented while the door and latch are still in the open and unlocked position, thereby substantially preventing movement or transfer of the cart while the door and latch are in the open and unlocked position.

In alternative example embodiments, the pin 230 and the hole 228 of the loop 226 may be keyed or otherwise shaped, e.g., a rotationally asymmetric shape, so as to allow insertion of the pin 230 into the hole 228 in only one orientation. Then, even if the state identifier 234 is provided on only one side of the identifier plate 232, the correspondingly keyed shapes of the pin 230 and the hole 228 of the loop 226 may ensure that the state identifier 234 is always presented and visible, e.g., facing away from the door or frame, for imaging or scanning because when the door and latch are in the closed and locked position, the pin 230 may be inserted into the hole 228 in only one correct orientation that presents or makes visible the state identifier 234.

In further alternative example embodiments, when the door and latch are in the open and unlocked position, the pin 230 may be received by or stowed in a separate hole of a temporary retaining loop (not shown), in order to prevent the pin 230 from freely moving or hanging via the wire or string 236 and potentially interfering with other operations. For example, the temporary retaining loop may be coupled to a portion of a door or frame of the cart, e.g., near or proximate an attachment of the wire or string 236 to the door or frame. In addition, the pin 230 and the separate hole of the temporary retaining loop may also be keyed or otherwise shaped, e.g., a rotationally asymmetric shape, so as to allow insertion of the pin 230 into the separate hole of the temporary retaining loop in only one orientation. Then, if the state identifier 234 is provided on only one side of the identifier plate 232, the correspondingly keyed shapes of the pin 230 and the separate hole of the temporary retaining loop may ensure that the state identifier 234 is always hidden and not visible, e.g., facing the door or frame, to prevent imaging or scanning because when the door and latch are in the open and unlocked position, the pin 230 may be inserted into the separate hole of the temporary retaining loop in only one correct orientation that hides or obscures the state identifier 234.

Furthermore, a second state identifier, e.g., an open state identifier, may be provided on the opposite side of the identifier plate 232. Then, because the second state identifier is provided on the opposite side of the identifier plate 232, the correspondingly keyed shapes of the pin 230 and the separate hole of the temporary retaining loop may ensure that the second state identifier is presented and visible, e.g., facing away from the door or frame, for imaging or scanning because when the door and latch are in the open and unlocked position, the pin 230 may be inserted into the separate hole of the temporary retaining loop in only one correct orientation that presents the second state identifier. In this manner, in addition to hiding or obscuring the state identifier 234, which may result in an absence or lack of scanning of the closed state identifier, to prevent movement or transfer of the cart while the door and latch are in the open and unlocked position, a second state identifier, e.g., the open state identifier, may also be presented for imaging or scanning, which may result in a positive scanning of the open state identifier, to further prevent movement or transfer of the cart while the door and latch are in the open and unlocked position.

Figure 3A:
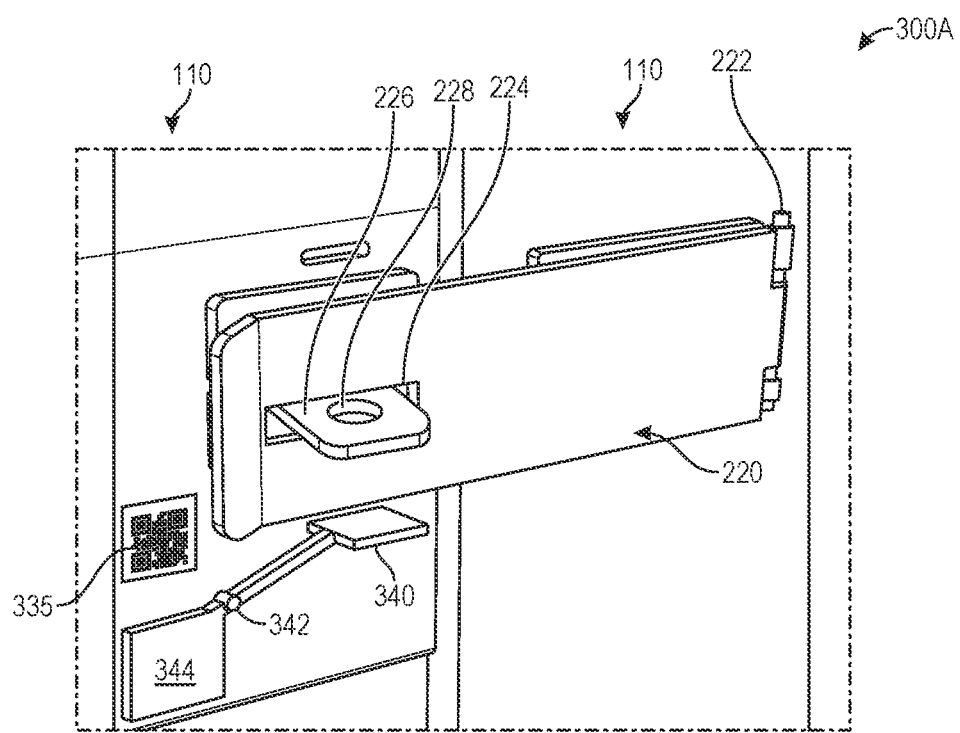
FIG. 3A is a schematic diagram of a second example door latch having state identifiers in an open position, in accordance with implementations of the present disclosure.
Figure 3B:
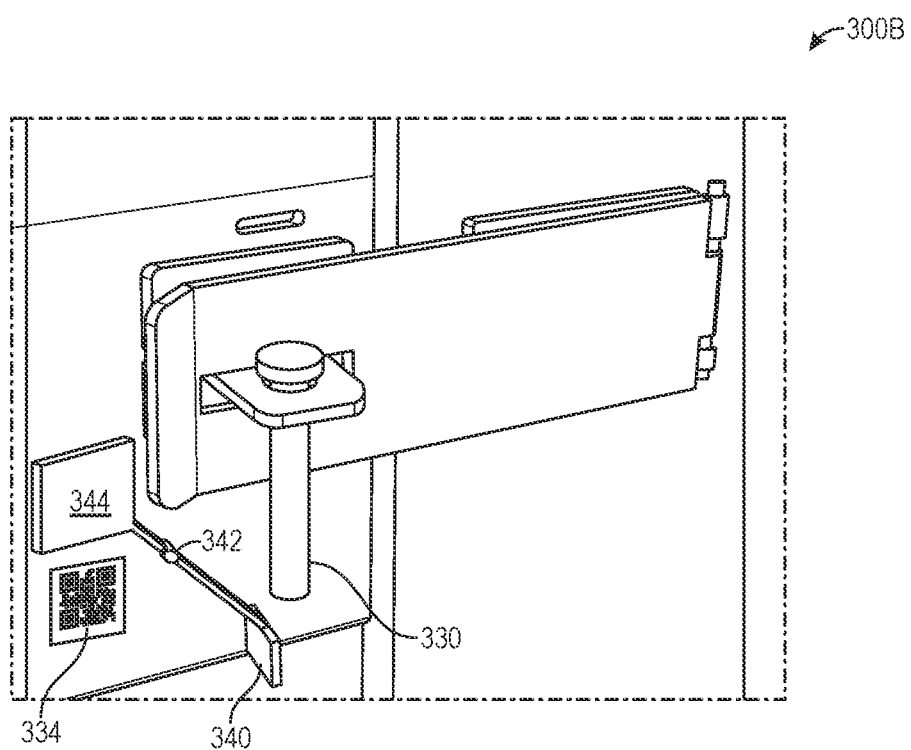
FIG. 3B is a schematic diagram of the second example door latch having state identifiers in a closed position, in accordance with implementations of the present disclosure.

FIG. 3A is a schematic diagram 300A of a second example door latch having state identifiers in an open position, in accordance with implementations of the present disclosure, and FIG. 3B is a schematic diagram 300B of the second example door latch having state identifiers in a closed position, in accordance with implementations of the present disclosure. Elements of FIGS. 3A and 3B having reference numerals similar to those shown and described with respect to other portions of this disclosure may include any and all of the features described therein.

The second example door latch may include a hasp 220 having a slot 224 that is movably coupled to a portion of a door 110 via a hinge 222. The hasp 220 may comprise a sheet, plate, beam, or other bent, formed, or shaped material, and the hasp 220 may be formed of various materials, such as metals, wood, plastics, composites, other materials, or combinations thereof. The hasp 220 may rotate substantially freely via the hinge 222 between an open position, as partially shown in FIG. 3A, and a closed position, as shown in FIG. 3B.

In addition, the latch may include a loop 226 having a hole or slot 228 that is coupled to a portion of another door 110. The loop 226 may comprise a sheet, plate, beam, or other bent, formed, or shaped material, and the loop 226 may be formed of various materials, such as metals, wood, plastics, composites, other materials, or combinations thereof. When the hasp 220 is in the open position, as partially shown in FIG. 3A, the hasp 220 may be freely movable relative to the loop 226, and/or the loop 226 may be substantially removed from the slot 224 of the hasp 220. Further, when the hasp 220 is in the closed position, as shown in FIG. 3B, the loop 226 may be substantially inserted into the slot 224 of the hasp 220.

Further, the latch may include a pin 330 that may be attached to a portion of a door via a wire or string (not shown), and the pin 330 may be configured to be inserted into the hole or slot 228 of the loop 226. The pin 330 may comprise a sheet, plate, beam, rod, or other bent, formed, or shaped material, and the pin 330 may be formed of various materials, such as metals, wood, plastics, composites, other materials, or combinations thereof. In addition, the pin 330 may be captured or retained relative to the cart by attachment via the wire or string.

Moreover, the latch may include a rotatable plate having a paddle 340, a pivot 342, and a plate 344. The rotatable plate may be movably or rotatably coupled to the door or frame via the pivot 342, e.g., a pin, rod, screw, or other rotatable joint. The rotatable plate may comprise a sheet, plate, beam, rod, or other bent, formed, or shaped material, and the rotatable plate may be formed of various materials, such as metals, wood, plastics, composites, other materials, or combinations thereof. When inserted, the pin 330 may contact or engage with the paddle 340 and move or rotate the paddle 340 and plate 344 around the pivot 342 between two positions. In addition, the plate 344 may hide or obscure one of the state identifiers, e.g., closed state identifier 334 and open state identifier 335 presented on a door or frame of the cart, as the plate 344 moves or rotates between the two positions. The state identifiers or codes 334, 335 may comprise symbols, characters, numbers, text, colors, patterns, barcodes, quick response (QR) codes, or any other types of identifiers or codes, and the state identifiers 334, 335 may comprise human-readable, machine-readable, and/or computer-readable identifiers or codes. Further, the rotatable plate may be biased toward one of the positions, e.g., the position shown in FIG. 3A, either by a bias element associated with the pivot 342 or other portion of the rotatable plate, or by gravity due to a greater weight or mass of the plate 344 relative to a lesser weight or mass of the paddle 340.

When the hasp 220 is in the open position, as partially shown in FIG. 3A, the pin 330 may be substantially removed from the hole 228 of the loop 226, and the second example door latch may be in the unlocked position. In this open and unlocked position, the rotatable plate may be in the position shown in FIG. 3A in which the plate 344 hides or obscures the closed state identifier 334, while allowing the open state identifier 335 to be presented and visible for imaging or scanning. In this manner, scanning of the closed state identifier 334 may be prevented, whereas scanning of the open state identifier 335 may be permitted in the open and unlocked position, thereby substantially preventing movement or transfer of the cart while the door and latch are in the open and unlocked position.

Further, when the hasp 220 is in the closed position, as shown in FIG. 3B, the pin 330 may be substantially inserted into the hole 228 of the loop 226, and the second example door latch may be in the locked position. In this closed and locked position, the pin 330 may cause rotation of the rotatable plate to the position shown in FIG. 3B in which the plate 344 hides or obscures the open state identifier 335, while allowing the closed state identifier 334 to be presented and visible for imaging or scanning. In this manner, scanning of the open state identifier 335 may be prevented, whereas scanning of the closed state identifier 334 may be permitted in the closed and locked position, thereby enabling movement or transfer of the cart while the door and latch are in the closed and locked position.

Figure 4A:
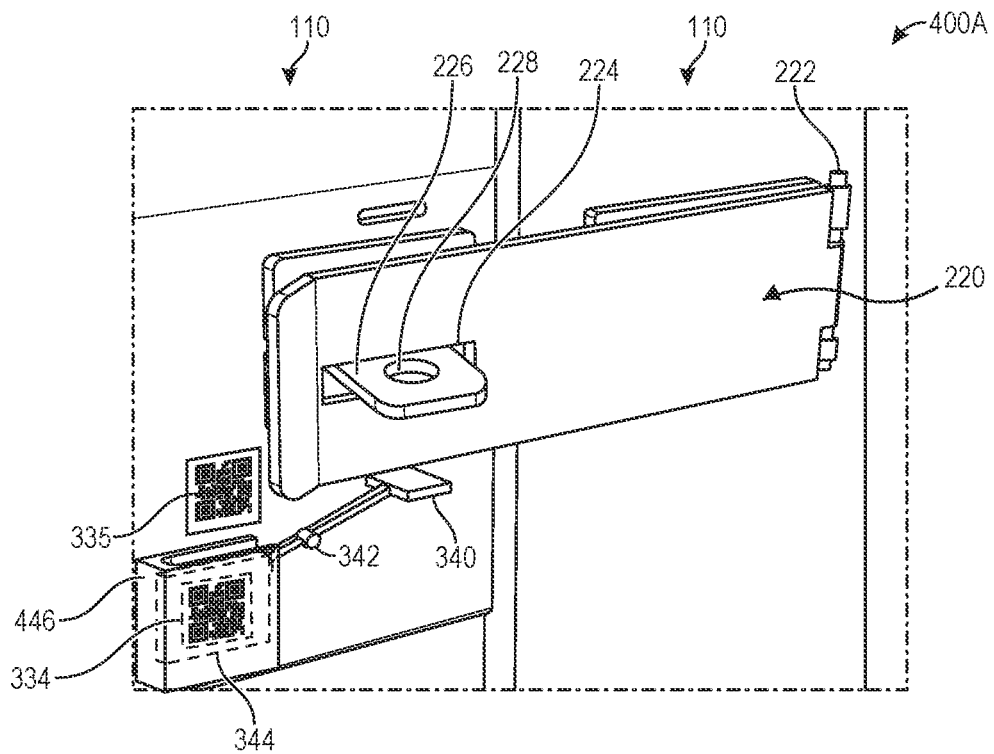
FIG. 4A is a schematic diagram of a third example door latch having state identifiers in an open position, in accordance with implementations of the present disclosure.
Figure 4B:
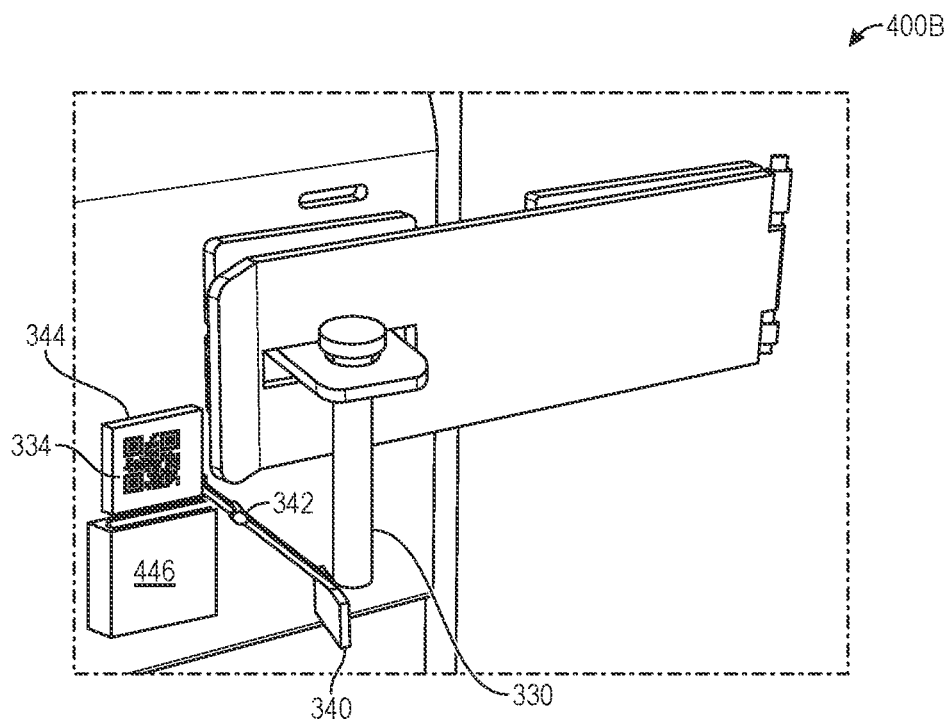
FIG. 4B is a schematic diagram of the third example door latch having state identifiers in a closed position, in accordance with implementations of the present disclosure.

FIG. 4A is a schematic diagram 400A of a third example door latch having state identifiers in an open position, in accordance with implementations of the present disclosure, and FIG. 4B is a schematic diagram 400B of the third example door latch having state identifiers in a closed position, in accordance with implementations of the present disclosure. Elements of FIGS. 4A and 4B having reference numerals similar to those shown and described with respect to other portions of this disclosure may include any and all of the features described therein.

For example, the third example door latch of FIGS. 4A and 4B may include substantially all of the features shown and described herein with respect to FIGS. 3A and 3B. In contrast with the second example latch of FIGS. 3A and 3B, the third example latch may include an open state identifier 334 that is presented on a portion of the plate 344 of the rotatable plate. In addition, the third example latch may also include a housing or casing 446 into which the plate 344 of the rotatable plate may move or rotate in one of its positions, as shown in FIG. 4A. The housing 446 may comprise a sheet, plate, beam, box, sheath, or other bent, formed, or shaped material, and the housing 446 may be formed of various materials, such as metals, wood, plastics, composites, other materials, or combinations thereof.

When the hasp 220 is in the open position, as partially shown in FIG. 4A, the pin 330 may be substantially removed from the hole 228 of the loop 226, and the third example door latch may be in the unlocked position. In this open and unlocked position, the rotatable plate may be in the position shown in FIG. 4A in which the plate 344 and the closed state identifier 334 are hidden or obscured by the housing 446 to prevent imaging or scanning, while allowing the open state identifier 335 to be presented and visible for imaging or scanning. In this manner, scanning of the closed state identifier 334 may be prevented, whereas scanning of the open state identifier 335 may be permitted in the open and unlocked position, thereby substantially preventing movement or transfer of the cart while the door and latch are in the open and unlocked position.

Further, when the hasp 220 is in the closed position, as shown in FIG. 4B, the pin 330 may be substantially inserted into the hole 228 of the loop 226, and the third example door latch may be in the locked position. In this closed and locked position, the pin 330 may cause rotation of the rotatable plate to the position shown in FIG. 4B in which the plate 344 and closed state identifier 334 are moved or rotated out of the housing 446 so that the closed state identifier 334 may be presented and visible for imaging or scanning, while also hiding or obscuring the open state identifier 335 to prevent imaging or scanning. In this manner, scanning of the open state identifier 335 may be prevented, whereas scanning of the closed state identifier 334 may be permitted in the closed and locked position, thereby enabling movement or transfer of the cart while the door and latch are in the closed and locked position.

Figure 5A:
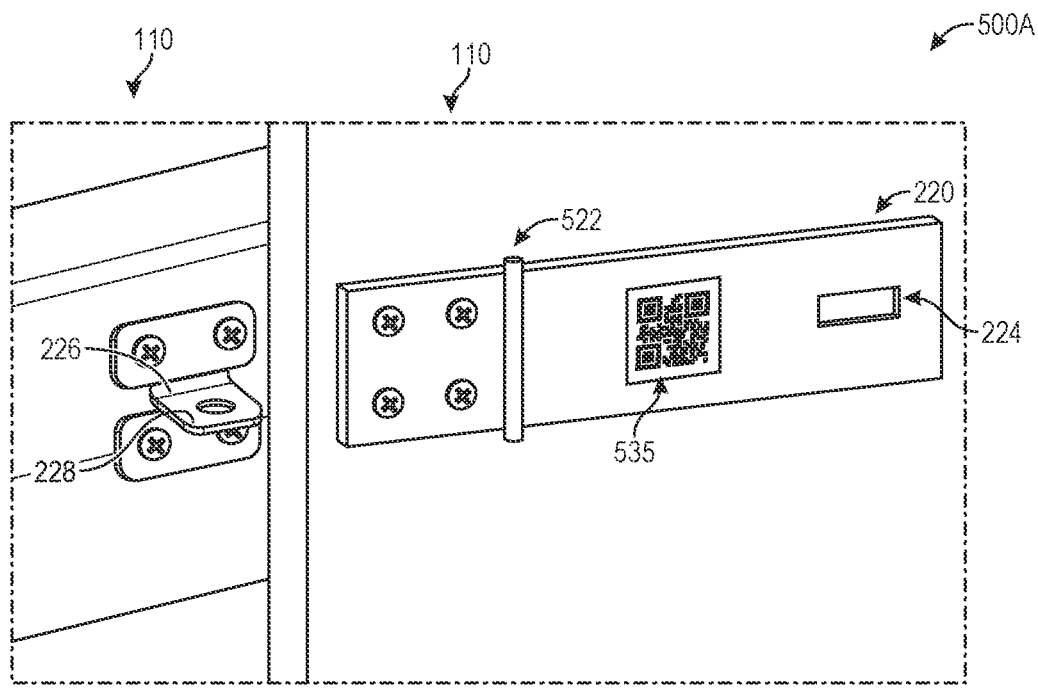
FIG. 5A is a schematic diagram of a fourth example door latch having state identifiers in an open position, in accordance with implementations of the present disclosure.
Figure 5B:
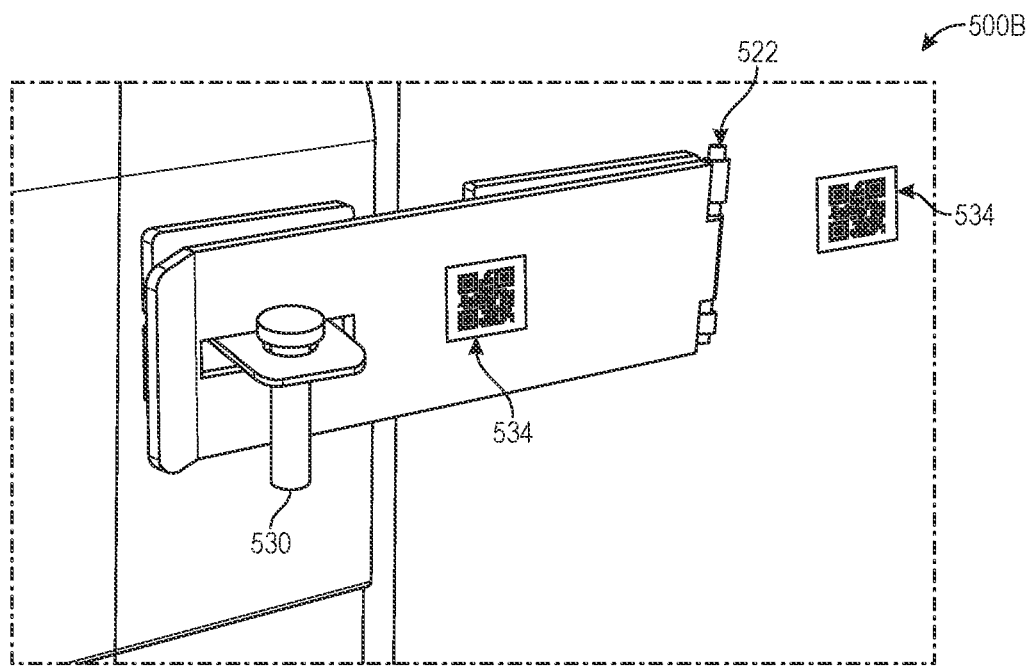
FIG. 5B is a schematic diagram of the fourth example door latch having state identifiers in a closed position, in accordance with implementations of the present disclosure.

FIG. 5A is a schematic diagram 500A of a fourth example door latch having state identifiers in an open position, in accordance with implementations of the present disclosure, and FIG. 5B is a schematic diagram 500B of the fourth example door latch having state identifiers in a closed position, in accordance with implementations of the present disclosure. Elements of FIGS. 5A and 5B having reference numerals similar to those shown and described with respect to other portions of this disclosure may include any and all of the features described therein.

For example, the fourth example door latch of FIGS. 5A and 5B may include substantially all of the features shown and described herein with respect to FIGS. 2A and 2B. In contrast with the first example latch of FIGS. 2A and 2B, the fourth example latch may include a hasp 220 that is movably coupled to a portion of a door 110 via a hinge 522 that is biased toward an open position. For example, the hinge 522 or other portion of the hasp 220 may include a bias element, such as a tension spring, compression spring, torsion spring, or other elastic or resilient element, that tends to move the hasp 220 to the open position, as shown in FIG. 5A, and away from a closed position, as shown in FIG. 5B. In addition, the fourth example latch may include one or more open state identifiers 535 that are presented on portions of the hasp 220 and/or door or frame that are presented and visible for scanning in the open position shown in FIG. 5A. Further, the fourth example latch may include one or more closed state identifiers 534 that are presented on portions of the hasp 220 and/or door or frame that are presented and visible for scanning in the closed position shown in FIG. 5B. Moreover, the state identifiers or codes 534, 535 may comprise symbols, characters, numbers, text, colors, patterns, barcodes, quick response (QR) codes, or any other types of identifiers or codes, and the state identifiers 534, 535 may comprise human-readable, machine-readable, and/or computer-readable identifiers or codes.

When the hasp 220 is in the open position, as shown in FIG. 5A, the pin 530 may be substantially removed from the hole 228 of the loop 226, and the fourth example door latch may be in the unlocked position. In this open and unlocked position, the hasp 220 may be biased to the open position via a bias element associated with the hinge 522 or other portion of the hasp 220. Portions of the hasp 220 may hide or obscure the closed state identifiers 534 to prevent imaging or scanning, whereas the open state identifiers 535 may be presented and visible for imaging or scanning. In this manner, scanning of the closed state identifiers 534 may be prevented, whereas scanning of the open state identifiers 535 may be permitted in the open and unlocked position, thereby substantially preventing movement or transfer of the cart while the door and latch are in the open and unlocked position.

Further, when the hasp 220 is in the closed position, as shown in FIG. 5B, the pin 530 may be substantially inserted into the hole 228 of the loop 226, and the fourth example door latch may be in the locked position. In this closed and locked position, the hasp 220 may be held in the closed position against the bias element associated with the hinge 522 or other portion of the hasp 220. Portions of the hasp 220 may hide or obscure the open state identifiers 535 to prevent imaging or scanning, whereas the closed state identifiers 534 may now be presented and visible for imaging or scanning. In this manner, scanning of the open state identifiers 535 may be prevented, whereas scanning of the closed state identifiers 534 may be permitted in the closed and locked position, thereby enabling movement or transfer of the cart while the door and latch are in the closed and locked position.

Figure 6A:
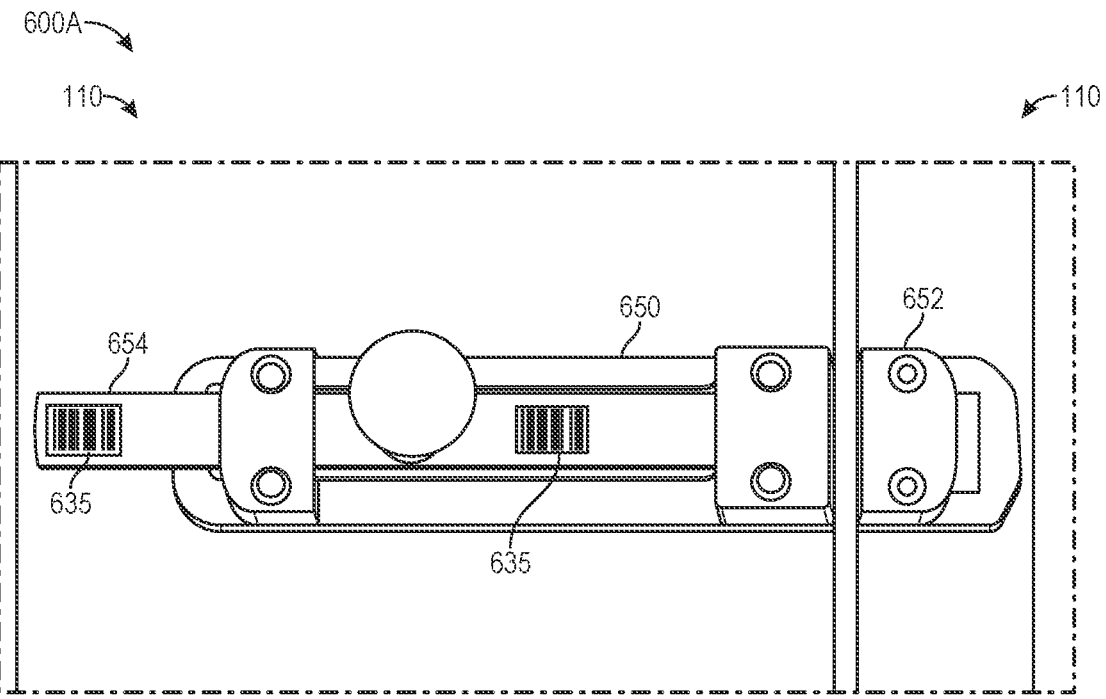
FIG. 6A is a schematic diagram of a fifth example door latch having state identifiers in an open position, in accordance with implementations of the present disclosure.
Figure 6B:
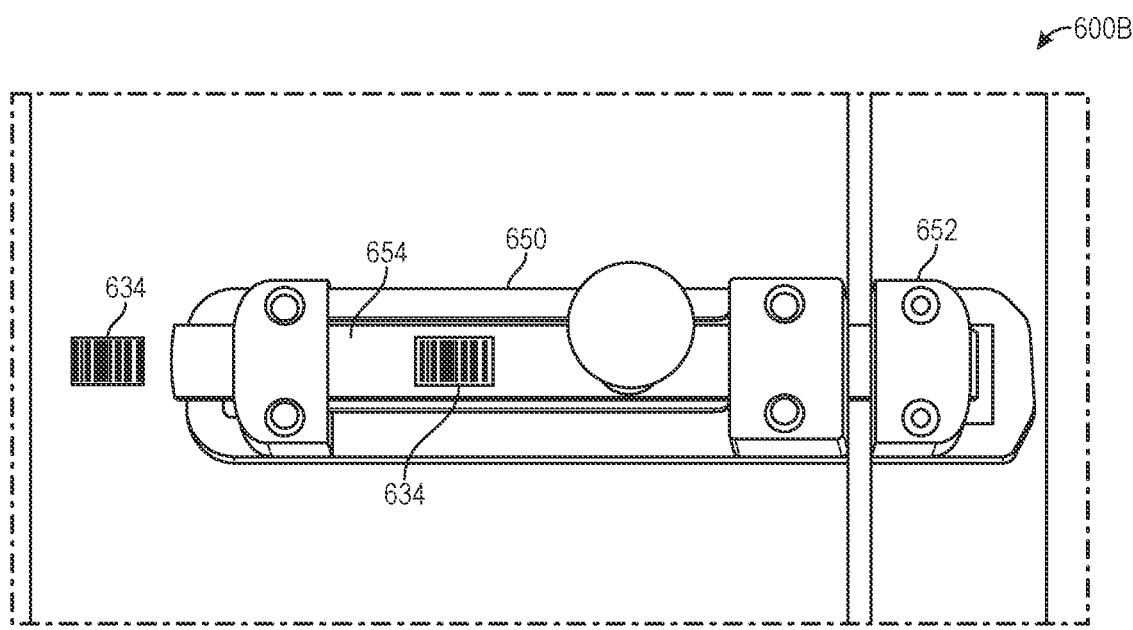
FIG. 6B is a schematic diagram of the fifth example door latch having state identifiers in a closed position, in accordance with implementations of the present disclosure.

FIG. 6A is a schematic diagram 600A of a fifth example door latch having state identifiers in an open position, in accordance with implementations of the present disclosure, and FIG. 6B is a schematic diagram 600B of the fifth example door latch having state identifiers in a closed position, in accordance with implementations of the present disclosure. Elements of FIGS. 6A and 6B having reference numerals similar to those shown and described with respect to other portions of this disclosure may include any and all of the features described therein.

The fifth example door latch may include a guide 650, a catch 652, and a sliding bolt 654. The guide 650 may be coupled to a portion of a door 110, and the catch 652 may be coupled to a portion of another door 110.

The guide 650 may movably or slidably hold or retain the sliding bolt 654, and may allow movement of the sliding bolt 654 between at least two positions, e.g., an open position as shown in FIG. 6A, and a closed position as shown in FIG. 6B. The catch 652 may be configured to receive a portion of the sliding bolt 654, e.g., an end portion, when the sliding bolt 654 is moved to the closed position, thereby retaining and locking the guide 650 and catch 652 relative to each other. The guide 650, catch 652, and sliding bolt 654 may comprise bent, formed, or shaped materials, and the guide 650, catch 652, and sliding bolt 654 may be formed of various materials, such as metals, wood, plastics, composites, other materials, or combinations thereof.

Further, one or more portions of the fifth example latch, such as portions of the sliding bolt 654 and/or portions of a door or frame, may include one or more state identifiers or codes 634, 635 to indicate a state of a door and latch, e.g., a closed state or an open state. The state identifiers or codes 634, 635 may comprise symbols, characters, numbers, text, colors, patterns, barcodes, quick response (QR) codes, or any other types of identifiers or codes, and the state identifiers 634, 635 may comprise human-readable, machine-readable, and/or computer-readable identifiers or codes.

When the sliding bolt 654 is in the open position, as shown in FIG. 6A, the sliding bolt 654 may be substantially removed from the catch 652, and the fifth example door latch may be in the unlocked position. In this open and unlocked position, the sliding bolt 654 may be moved or slid to one extreme relative to the guide 650, e.g., toward a left side of guide 650 as shown in FIG. 6A. Portions of the guide 650 and/or sliding bolt 654 may hide or obscure the closed state identifiers 634 to prevent imaging or scanning, whereas the open state identifiers 635 may be presented and visible for imaging or scanning. In this manner, scanning of the closed state identifiers 634 may be prevented, whereas scanning of the open state identifiers 635 may be permitted in the open and unlocked position, thereby substantially preventing movement or transfer of the cart while the door and latch are in the open and unlocked position.

Further, when the sliding bolt 654 is in the closed position, as shown in FIG. 6B, the sliding bolt 654 may be substantially inserted into the catch 652, and the fifth example door latch may be in the locked position. In this closed and locked position, the sliding bolt 654 may be moved or slid to another extreme relative to the guide 650, e.g., toward a right side of guide 650 as shown in FIG. 6B. Portions of the guide 650 and/or sliding bolt 654 may hide or obscure the open state identifiers 635 to prevent imaging or scanning, whereas the closed state identifiers 634 may be presented and visible for imaging or scanning. In this manner, scanning of the open state identifiers 635 may be prevented, whereas scanning of the closed state identifiers 634 may be permitted in the closed and locked position, thereby enabling movement or transfer of the cart while the door and latch are in the closed and locked position.

Figure 7A:
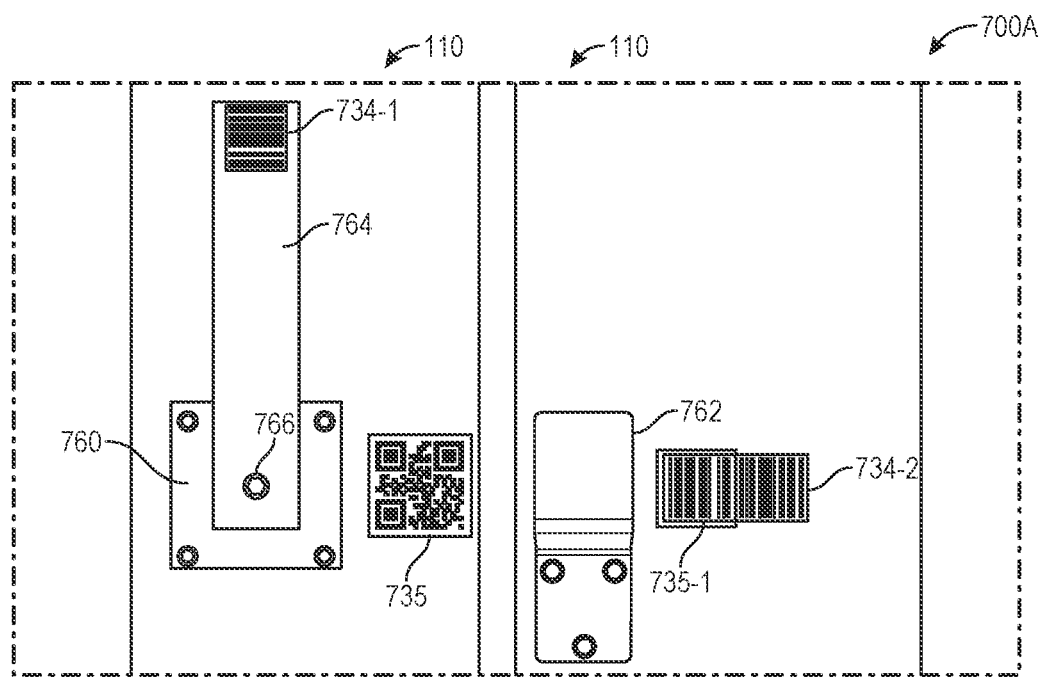
FIG. 7A is a schematic diagram of a sixth example door latch having state identifiers in an open position, in accordance with implementations of the present disclosure.
Figure 7B:
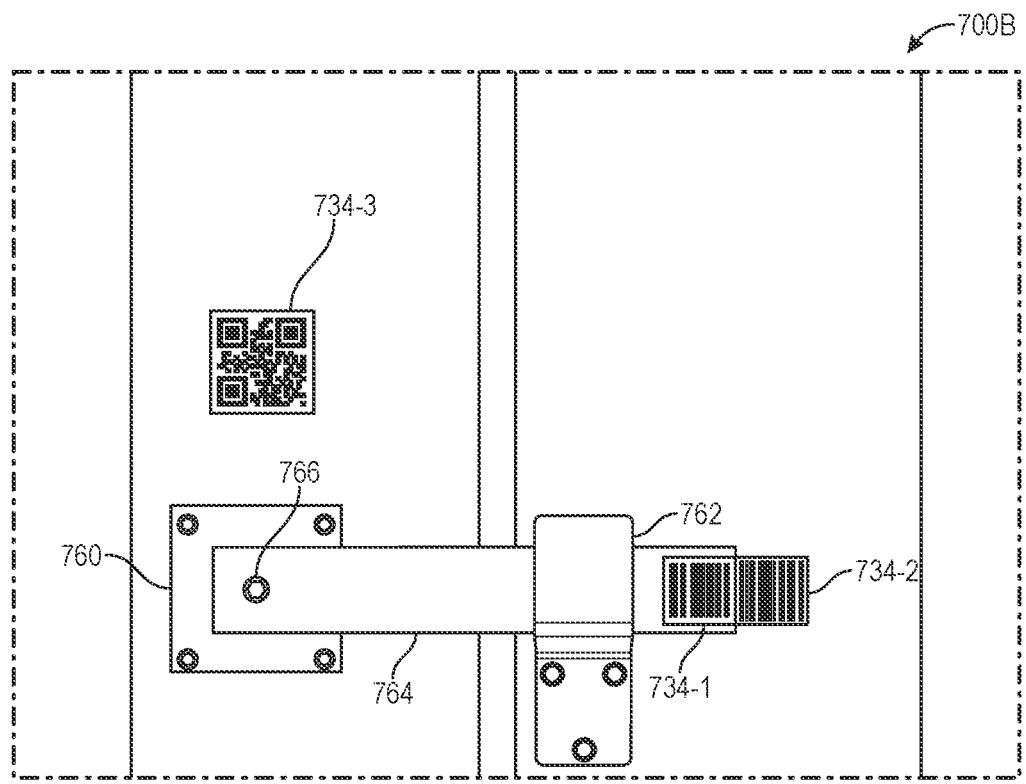
FIG. 7B is a schematic diagram of the sixth example door latch having state identifiers in a closed position, in accordance with implementations of the present disclosure.

FIG. 7A is a schematic diagram 700A of a sixth example door latch having state identifiers in an open position, in accordance with implementations of the present disclosure, and FIG. 7B is a schematic diagram 700B of the sixth example door latch having state identifiers in a closed position, in accordance with implementations of the present disclosure. Elements of FIGS. 7A and 7B having reference numerals similar to those shown and described with respect to other portions of this disclosure may include any and all of the features described therein.

The sixth example door latch may include a mount 760, a catch 762, a rotatable arm 764, and a pivot 766. The mount 760 may be coupled to a portion of a door 110, and the catch 762 may be coupled to a portion of another door 110.

The rotatable arm 764 may be movably or rotatably coupled to the mount 760 via the pivot 766, such that the rotatable arm 764 may move or rotate between at least two positions, e.g., an open position as shown in FIG. 7A, and a closed position as shown in FIG. 7B. The catch 762 may be configured to receive a portion of the rotatable arm 764, e.g., an end portion, when the rotatable arm 764 is moved to the closed position, thereby retaining and locking the mount 760 and catch 762 relative to each other. The mount 760, catch 762, rotatable arm 764, and pivot 766 may comprise sheets, plates, beams, rods, or other bent, formed, or shaped materials, and the mount 760, catch 762, rotatable arm 764, and pivot 766 may be formed of various materials, such as metals, wood, plastics, composites, other materials, or combinations thereof.

Further, one or more portions of the sixth example latch, such as portions of the rotatable arm 764 or mount 760, and/or portions of a door or frame, may include one or more state identifiers or codes 734, 735 to indicate a state of a door and latch, e.g., a closed state or an open state. The state identifiers or codes 734, 735 may comprise symbols, characters, numbers, text, colors, patterns, barcodes, quick response (QR) codes, or any other types of identifiers or codes, and the state identifiers 734, 735 may comprise human-readable, machine-readable, and/or computer-readable identifiers or codes.

In the example embodiments shown in FIGS. 7A and 7B, an open state identifier may comprise two portions of a single state identifier that is presented on different portions of the door or frame. For example, a first portion 735-1 of the open state identifier may be presented on a first portion of the door or frame, and a second portion 734-2 of the open state identifier may be presented on a second portion of the door or frame of the cart, and together, the first and second portions 735-1, 734-2 of the open state identifier may form a single state identifier that may be imaged or scanned, as shown in FIG. 7A.

In addition, a closed state identifier may also comprise two portions of a single state identifier that is split up and presented on different portions of the latch and/or door or frame. For example, a first portion 734-1 of the open state identifier may be presented on an end of the rotatable arm 764, and a second portion 734-2 of the open state identifier may be presented on a door or frame of the cart, and together, the first and second portions 734-1, 734-2 of the closed state identifier may form a single state identifier that may be imaged or scanned, as shown in FIG. 7B.

It should be noted that in this example, a portion 734-2 of a state identifier may be utilized as part of each of an open state identifier and a closed state identifier, and may be imaged or scanned in combination with different complementary portions, e.g., portion 734-1 or portion 735-1, of respective state identifiers.

When the rotatable arm 764 is in the open position, as shown in FIG. 7A, the rotatable arm 764 may be substantially moved or rotated away from the catch 762, and the sixth example door latch may be in the unlocked position. In this open and unlocked position, the rotatable arm 764 may be moved or rotated in one direction away from the catch 762, e.g., counterclockwise as shown in FIG. 7A. Portions of the rotatable arm 764 may hide, obscure, split, or separate portions of the closed state identifiers 734-1, 734-2, 734-3 to prevent imaging or scanning, whereas the open state identifiers 735 and 735-1, 734-2 may be presented and visible for imaging or scanning. In this manner, scanning of the closed state identifiers 734 may be prevented, whereas scanning of the open state identifiers 735 and 735-1, 734-2 may be permitted in the open and unlocked position, thereby substantially preventing movement or transfer of the cart while the door and latch are in the open and unlocked position.

Further, when the rotatable arm 764 is in the closed position, as shown in FIG. 7B, the rotatable arm 764 may be substantially moved or rotated into the catch 762, and the sixth example door latch may be in the locked position. In this closed and locked position, the rotatable arm 764 may be moved or rotated in another direction toward the catch 762, e.g., clockwise as shown in FIG. 7B. Portions of the rotatable arm 764 may hide or obscure the open state identifiers 735, 735-1 to prevent imaging or scanning, whereas the closed state identifiers 734-1, 734-2, 734-3 may be presented and visible for imaging or scanning. In addition, the portions of closed state identifiers 734-1, 734-2 may be positioned adjacent each other to permit scanning of the combined identifiers. In this manner, scanning of the open state identifiers 735, 735-1 may be prevented, whereas scanning of the closed state identifiers 734 may be permitted in the closed and locked position, thereby enabling movement or transfer of the cart while the door and latch are in the closed and locked position.

Although FIG. 7A illustrates a particular open position of the rotatable arm 764, e.g., rotated approximately 90 degrees via the pivot 766, in other example embodiments, the rotatable arm 764 may rotate via the pivot 766 to other open positions. For example, the rotatable arm 764 may rotate substantially 180 degrees between the closed position as shown in FIG. 7B, and an open position in which the rotatable arm 764 may extend in a direction substantially opposite to the closed position relative to the pivot 766. In addition, the rotatable arm 764 may be received by an additional catch, e.g., similar to the catch 762, when rotated to the open position. Further, one or more open and/or closed state identifiers 734, 735 may be positioned in different locations to be hidden, obscured, separated, uncovered, combined, or visible based on the different open and closed positions of the rotatable arm 764.

In additional example embodiments, one or more displays, screens, monitors, or other presentation devices may be included on a cart, door, frame, and/or latch to selectively and/or dynamically present one or more state identifiers. For example, the displays may comprise e-ink displays, screens or monitors similar to those included on mobile devices, or other types of presentation devices. Further, one or more sensors or switches may also be included in portions of the cart, door, frame, and/or latch and be in communication with the displays or other presentation devices. For example, the sensors or switches may comprise proximity sensors, contact or pressure sensors or switches, photoeyes, or other types of presence detection sensors or switches. In addition, one or more power supplies or batteries may be included to provide power to the presentation devices, sensors, and/or switches.

In the example embodiments described herein with respect to FIGS. 2A-5B, one or more sensors or switches may be associated with portions of the hasp, hinge, loop, pin, rotatable plate, door, and/or frame to detect open or closed states of the doors and latches, and one or more displays may present one or more corresponding state identifiers based on data from the sensors or switches.

In the example embodiments described herein with respect to FIGS. 6A-6B, one or more sensors or switches may be associated with portions of the guide, catch, sliding bolt, door, and/or frame to detect open or closed states of the doors and latches, and one or more displays may present one or more corresponding state identifiers based on data from the sensors or switches.

In the example embodiments described herein with respect to FIGS. 7A-7B, one or more sensors or switches may be associated with portions of the mount, rotatable arm, catch, pivot, door, and/or frame to detect open or closed states of the doors and latches, and one or more displays may present one or more corresponding state identifiers based on data from the sensors or switches.

Various aspects or portions of the example embodiments described herein may be combined or modified in various combinations or arrangements. For example, any of the example embodiments may include state identifiers that are split or separated into two or more portions, and which may be imaged or scanned only in response to positioning the two or more portions of such state identifiers in correct positions and orientations relative to each other. In addition, aspects of the rotatable plate having a paddle, pivot, and plate as shown in FIGS. 3A-4B may be combined with various other example embodiments described herein to hide, obscure, present, or make visible one or more state identifiers as desired.

In further example embodiments, a plurality of open state identifiers and/or a plurality of closed state identifiers may be included in any of the example embodiments described herein. For example, imaging or scanning of the plurality of closed state identifiers, e.g., all of the plurality of closed state identifiers, may be required in order to confirm that a door and latch are in the closed and locked position. In addition, if the imaging or scanning includes one or more open state identifiers in addition to one or more closed state identifiers, the door and latch may not be confirmed as being in the closed and locked position. That is, the determination that a single open state identifier of a plurality of open state identifiers has been imaged or scanned may result in the determination that the door and latch are in the open and unlocked position, thereby preventing movement or transfer of the cart until only, and potentially all, closed state identifiers of a plurality of closed state identifiers have been imaged or scanned.

Using such state identifiers to indicate open/closed states of doors and/or locked/unlocked states of latches, safe and efficient operations of the carts may be more reliably performed. In example embodiments, the cart closure systems having associated state identifiers may enable various operations, such as loading, transport, or unloading operations of the carts, to be safely and efficiently performed by human agents and/or by automated or robotic agents, such as robotic drive units, automated movement apparatus, or other machinery, equipment, or automation.

Figure 8:
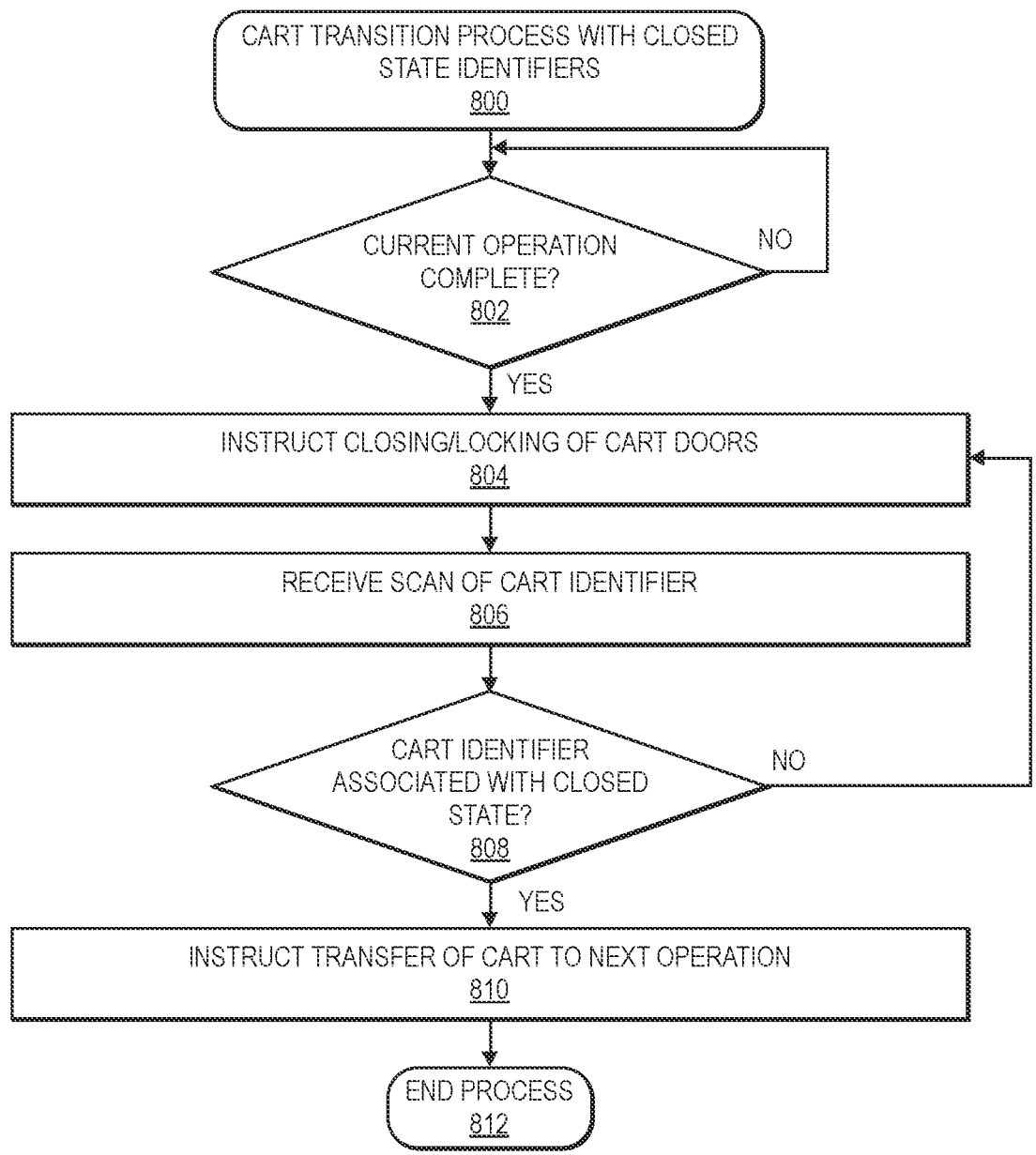
FIG. 8 is a flow diagram illustrating an example cart transition process with closed state identifiers process, in accordance with implementations of the present disclosure.

FIG. 8 is a flow diagram illustrating an example cart transition process with closed state identifiers process 800, in accordance with implementations of the present disclosure.

The process 800 may begin by determining whether a current operation is complete, as at 802. For example, various operations may be performed with respect to carts, such as loading, unloading, reconfiguring, service, cleaning, maintenance, or other types of operations. One or more human agents and/or robotic or automated machines, equipment, or systems may perform the various operations. Further, a control system may instruct or command the various operations, and may determine whether such operations are complete. If it is determined that the current operation is not complete, the process may continue to iterate at step 802 until completion of the current operation.

If it is determined that the current operation is complete, the process 800 may continue by instructing closing and locking of cart doors, as at 804. For example, a cart may include one or more doors having associated latches. The doors may be closed, and the latches may be secured or locked after completion of the current operation and in preparation for a next operation. The latches may comprise any of the example embodiments described herein, and various combinations thereof. One or more human agents and/or robotic or automated machines, equipment, or systems may close and lock the cart doors. Further, a control system may instruct or command the closing and locking of cart doors.

The process 800 may then proceed by receiving a scan of a cart identifier, as at 806. For example, an imaging device or scanning device may be used to image or scan a state identifier associated with the cart and/or latch. In example embodiments, the state identifier may be a closed state identifier. One or more human agents and/or robotic or automated machines, equipment, or systems may scan the state identifier. Further, a control system may instruct or command scanning of the state identifier, and may receive data associated with the scan.

The process 800 may then continue to determine whether the cart identifier is associated with a closed state, as at 808. For example, the data associated with the scan may be compared to an expected or known state identifier associated with the cart and/or latch. Further, a control system may instruct or command processing or analysis of the data associated with the scan, and comparison or matching of such data with an expected or known state identifier.

If the data associated with the scan does not match the expected or known state identifier, it may be determined that the cart doors are not correctly closed and latched. For example, the data associated with the scan may include a partial state identifier, a different state identifier, an unknown state identifier, or no state identifier at all. In such a case, the process 800 may return to step 804 to again instruct closing and locking of the cart doors and continue the process 800 from there.

If the data associated with the scan does match the expected or known state identifier, it may be determined that the cart doors are correctly closed and latched. Then, the process 800 may proceed to instruct transfer of the cart to a next operation, as at 810. For example, various operations may be performed with respect to carts, such as transport or movement to a next operation. One or more human agents and/or robotic or automated machines, equipment, or systems may perform the transport or movement operations. Further, a control system may instruct or command the transport or movement operations.

The process 800 may then end, as at 812.

Figure 9:
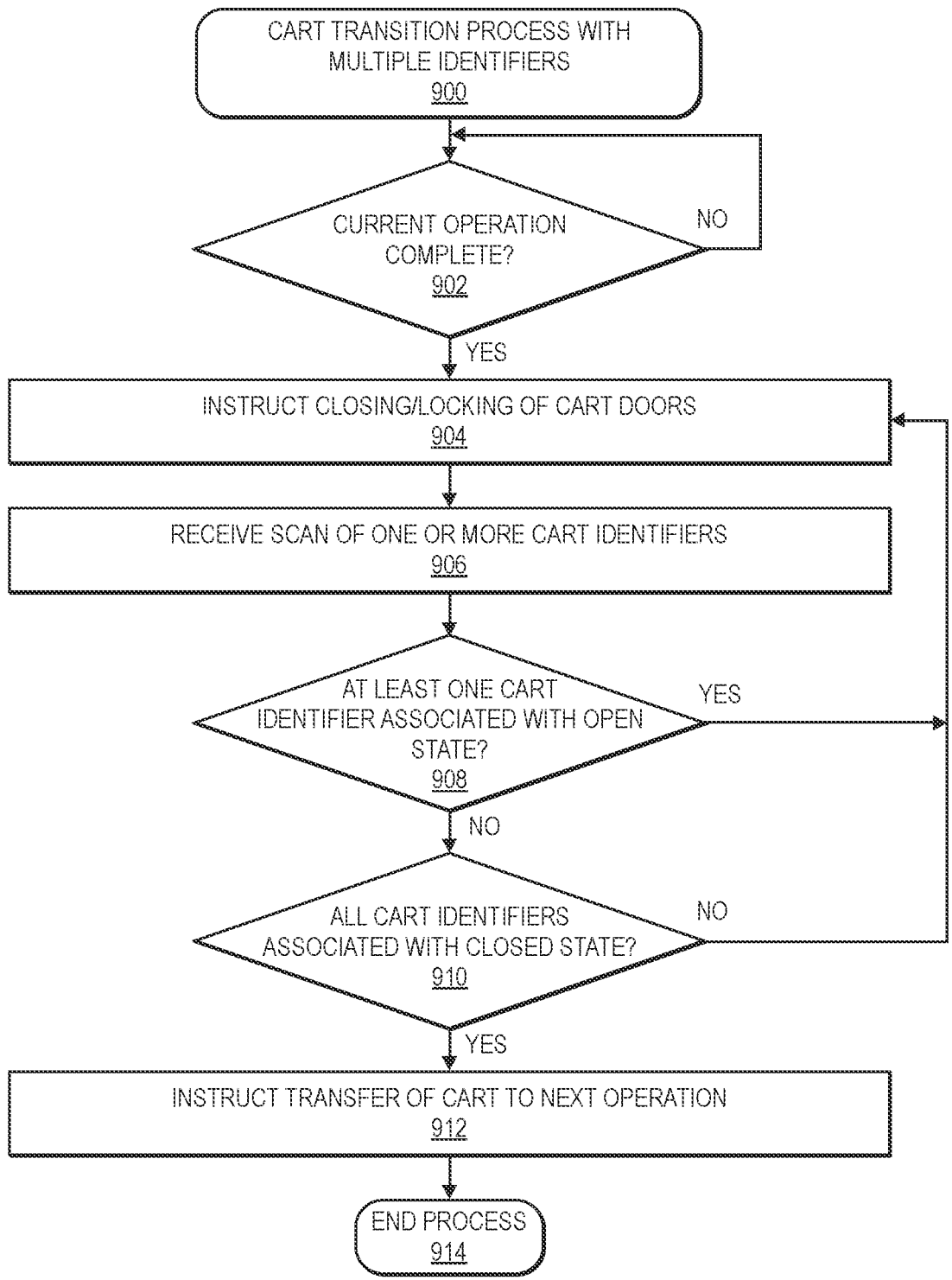
FIG. 9 is a flow diagram illustrating an example cart transition process with multiple identifiers process, in accordance with implementations of the present disclosure.

FIG. 9 is a flow diagram illustrating an example cart transition process with multiple identifiers process 900, in accordance with implementations of the present disclosure.

The process 900 may begin by determining whether a current operation is complete, as at 902. For example, various operations may be performed with respect to carts, such as loading, unloading, reconfiguring, service, cleaning, maintenance, or other types of operations. One or more human agents and/or robotic or automated machines, equipment, or systems may perform the various operations. Further, a control system may instruct or command the various operations, and may determine whether such operations are complete. If it is determined that the current operation is not complete, the process may continue to iterate at step 902 until completion of the current operation.

If it is determined that the current operation is complete, the process 900 may continue by instructing closing and locking of cart doors, as at 904. For example, a cart may include one or more doors having associated latches. The doors may be closed, and the latches may be secured or locked after completion of the current operation and in preparation for a next operation. The latches may comprise any of the example embodiments described herein, and various combinations thereof. One or more human agents and/or robotic or automated machines, equipment, or systems may close and lock the cart doors. Further, a control system may instruct or command the closing and locking of cart doors.

The process 900 may then proceed by receiving a scan of one or more cart identifiers, as at 906. For example, an imaging device or scanning device may be used to image or scan one or more state identifiers associated with the cart and/or latch. In example embodiments, the state identifiers may include one or more closed state identifiers and/or one or more open state identifiers. One or more human agents and/or robotic or automated machines, equipment, or systems may scan the state identifiers. Further, a control system may instruct or command scanning of the state identifiers, and may receive data associated with the scan.

The process 900 may then continue to determine whether at least one cart identifier is associated with an open state, as at 908. For example, the data associated with the scan may be compared to one or more expected or known open state identifiers associated with the cart and/or latch. Further, a control system may instruct or command processing or analysis of the data associated with the scan, and comparison or matching of such data with one or more expected or known open state identifiers.

If the data associated with the scan does match any of the one or more expected or known open state identifiers, it may be determined that the cart doors are not correctly closed and latched. For example, the data associated with the scan may include one or more open state identifiers associated with the cart and/or latch. In such a case, the process 900 may return to step 904 to again instruct closing and locking of the cart doors and continue the process 900 from there.

If the data associated with the scan does not match any of the one or more expected or known open state identifiers, the process 900 may then proceed to determine whether all cart identifiers are associated with a closed state, as at 910. For example, the data associated with the scan may be compared to one or more, and potentially all, expected or known closed state identifiers associated with the cart and/or latch. Further, a control system may instruct or command processing or analysis of the data associated with the scan, and comparison or matching of such data with one or more expected or known closed state identifiers.

If the data associated with the scan does not match all the expected or known closed state identifiers, it may be determined that the cart doors are not correctly closed and latched. For example, the data associated with the scan may include a partial state identifier, a different state identifier, an unknown state identifier, an open state identifier, a missing state identifier, or no state identifier at all. In such a case, the process 900 may return to step 904 to again instruct closing and locking of the cart doors and continue the process 900 from there.

If the data associated with the scan does match all the expected or known closed state identifiers, it may be determined that the cart doors are correctly closed and latched. Then, the process 900 may proceed to instruct transfer of the cart to a next operation, as at 912. For example, various operations may be performed with respect to carts, such as transport or movement to a next operation. One or more human agents and/or robotic or automated machines, equipment, or systems may perform the transport or movement operations. Further, a control system may instruct or command the transport or movement operations.

The process 900 may then end, as at 914.

Figure 10:
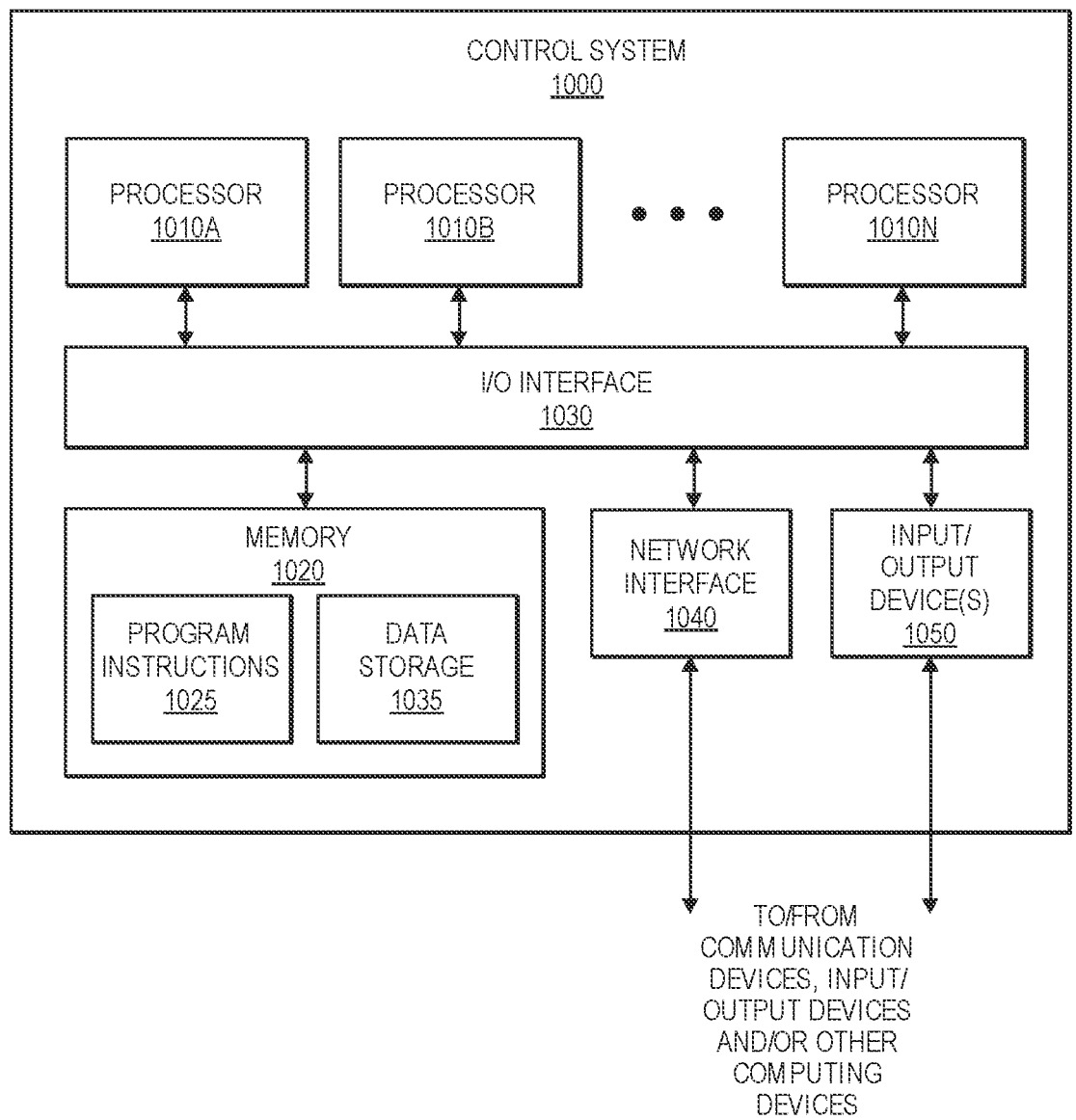
FIG. 10 is a block diagram illustrating various components of an example control system, in accordance with implementations of the present disclosure.

FIG. 10 is a block diagram illustrating an example control system 1000, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 10. In the illustrated implementation, a control system 1000 includes one or more processors 1010A, 1010B through 1010N, coupled to a non-transitory computer-readable storage medium 1020 via an input/output (I/O) interface 1030. The control system 1000 further includes a network interface 1040 coupled to the I/O interface 1030, and one or more input/output devices 1050. In some implementations, it is contemplated that a described implementation may be implemented using a single instance of the control system 1000 while, in other implementations, multiple such systems or multiple nodes making up the control system 1000 may be configured to host different portions or instances of the described implementations. For example, in one implementation, some data sources or services (e.g., related to portions of cart closure systems, operations, or processes, etc.) may be implemented via one or more nodes of the control system 1000 that are distinct from those nodes implementing other data sources or services (e.g., related to other portions of cart closure systems, operations, or processes, etc.).

In various implementations, the control system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer-readable storage medium 1020 or the control system 1000. Generally speaking, a non-transitory, computer-readable storage medium may include storage media or memory media such as magnetic or optical media, e.g., disk or CD/DVD-ROM, coupled to the control system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices, including the network interface 1040 or other peripheral interfaces, such as input/output devices 1050. In some implementations, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the control system 1000 and other devices attached to a network, such as other control systems, material handling system controllers, warehouse management systems, other computer systems, robotic drive units, machines, or systems, automated movement systems, machinery, or equipment, imaging devices, scanning devices, various types of sensors or switches, displays or presentation devices, upstream stations or processes, downstream stations or processes, other material handling systems or equipment, or between nodes of the control system 1000. In various implementations, the network interface 1040 may support communication via wired or wireless general data networks, such as any suitable type of Ethernet network.

Input/output devices 1050 may, in some implementations, include one or more visual input/output devices, displays, projection devices, audio input/output devices, keyboards, keypads, touchpads, scanning devices, imaging devices, sensors, photo eyes, proximity sensors, switches, RFID readers, voice or optical recognition devices, or any other devices suitable for entering or retrieving data by one or more control systems 1000. Multiple input/output devices 1050 may be present in the control system 1000 or may be distributed on various nodes of the control system 1000. In some implementations, similar input/output devices may be separate from the control system 1000 and may interact with one or more nodes of the control system 1000 through a wired or wireless connection, such as over the network interface 1040.

As shown in FIG. 10, the memory 1020 may include program instructions 1025 that may be configured to implement one or more of the described implementations and/or provide data storage 1035, which may comprise various tables, data stores and/or other data structures accessible by the program instructions 1025. The program instructions 1025 may include various executable instructions, programs, or applications to facilitate cart closure systems and methods described herein, such as loading, unloading, transport, and other cart operations controllers, drivers, or applications, robotic drive unit or automated movement system controllers, drivers, or applications, sensor or switch controllers, drivers, or applications, sensor or switch data processing applications, display or presentation device controllers, drivers, or applications, imaging or scanning device controllers, drivers, or applications, imaging or scanning data processing applications, material handling equipment controllers, drivers, or applications, upstream station controllers, drivers, or applications, downstream station controllers, drivers, or applications, etc. The data storage 1035 may include various data stores for maintaining data related to systems, operations, or processes described herein, such as carts, doors, latches, items or objects, robotic drive units, automated movement systems, sensors, switches, displays or presentation devices, imaging or scanning devices, imaging or scanning data, open state identifiers, closed state identifiers, material handling equipment or apparatus, upstream systems, stations, or processes, downstream systems, stations, or processes, etc.

Those skilled in the art will appreciate that the control system 1000 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8 and 9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A closure apparatus for a container, comprising:
   a door configured to move between an open position and a closed position; and
   a latch configured to move between an unlocked position and a locked position;
   wherein the door is maintained in the closed position responsive to the latch being in the locked position; and
   wherein a computer-readable, closed state identifier is visually presented via a portion of the closure apparatus responsive to the latch being in the locked position.

2. The closure apparatus of claim 1, wherein:
   the latch comprises a hasp, a loop, and a pin;
   the hasp is configured to move between an open position and a closed position;
   in the locked position of the latch, the hasp is in the closed position, the loop extends through a slot of the hasp, and the pin is inserted into the loop; and
   the closed state identifier is presented on a portion of the pin.

3. The closure apparatus of claim 2, wherein:
   the pin and the loop are keyed so that the pin is configured to be inserted into the loop in one orientation to present a first side of the pin; and
   the closed state identifier is presented on the first side of the pin.

4. The closure apparatus of claim 3, wherein:
   in the unlocked position of the latch, the hasp is in the open position, the loop is removed from the slot of the hasp, and the pin is removed from the loop;
   a computer-readable, open state identifier is presented responsive to the latch being in the unlocked position; and
   the open state identifier is presented on a second side of the pin opposite the first side.

5. The closure apparatus of claim 1, wherein:
the latch comprises a hasp, a loop, a pin, and rotatable plate configured to move between a first position and a second position relative to a frame of the container;
the hasp is configured to move between an open position and a closed position;
in the locked position of the latch, the hasp is in the closed position, the loop extends through a slot of the hasp, the pin is inserted into the loop, and the pin rotates the rotatable plate to the second position; and
the closed state identifier is presented on at least one of a second portion of the frame of the container or a portion of the rotatable plate that is visible with the rotatable plate in the second position.

6. The closure apparatus of claim 5, wherein:
in the unlocked position of the latch, the hasp is in the open position, the loop is removed from the slot of the hasp, the pin is removed from the loop, and the rotatable plate is in the first position;
a computer-readable, open state identifier is presented responsive to the latch being in the unlocked position; and
the open state identifier is presented on a first portion of the frame of the container that is visible with the rotatable plate in the first position.

7. The closure apparatus of claim 1, wherein:
the latch comprises a hasp, a loop, and a pin;
the hasp is biased from a closed position toward an open position via a bias element;
in the locked position of the latch, the hasp is in the closed position, the loop extends through a slot of the hasp, and the pin is inserted into the loop; and
the closed state identifier is presented on a first portion of the hasp that is visible with the hasp in the closed position.

8. The closure apparatus of claim 7, wherein:
in the unlocked position of the latch, the hasp is in the open position, the loop is removed from the slot of the hasp, and the pin is removed from the loop;
a computer-readable, open state identifier is presented responsive to the latch being in the unlocked position; and
the open state identifier is presented on a second portion of the hasp that is visible with the hasp in the open position.

9. The closure apparatus of claim 1, wherein:
the latch comprises a guide, a sliding bolt, and a catch;
the sliding bolt is configured to move between an open position and a closed position;
in the locked position of the latch, the sliding bolt moves to the closed position relative to the guide and extends into a slot of the catch; and
the closed state identifier is presented on at least one of a portion of a frame of the container or a first portion of the sliding bolt that is visible with the sliding bolt in the closed position.

10. The closure apparatus of claim 9, wherein:
in the unlocked position of the latch, the sliding bolt moves to the open position relative to the guide and is removed from the slot of the catch;
a computer-readable, open state identifier is presented responsive to the latch being in the unlocked position; and
the open state identifier is presented on a second portion of the sliding bolt that is visible with the sliding bolt in the open position.

11. The closure apparatus of claim 1, wherein:
the latch comprises a mount, a pivot, a rotatable arm, and a catch;
the rotatable arm is configured to rotate between an open position and a closed position;
in the locked position of the latch, the rotatable arm rotates to the closed position via the pivot and extends into the catch; and
the closed state identifier is presented on a first portion of a frame of the container and a portion of the rotatable arm.

12. The closure apparatus of claim 11, wherein:
in the unlocked position of the latch, the rotatable arm rotates to the open position via the pivot and is removed from the catch;
a computer-readable, open state identifier is presented responsive to the latch being in the unlocked position; and
the open state identifier is presented on the first portion of the frame of the container and a second portion of the frame of the container that is visible with the rotatable arm in the open position.

13. The closure apparatus of claim 1, wherein:
the latch comprises a display and at least one of a switch or a sensor;
in the locked position of the latch, the at least one of the switch or the sensor is actuated; and
the closed state identifier is presented via the display of the latch responsive to actuation of the at least one of the switch or the sensor.

14. The closure apparatus of claim 13, wherein:
in the unlocked position of the latch, the at least one of the switch or the sensor is not actuated;
a computer-readable, open state identifier is presented responsive to the latch being in the unlocked position; and
the open state identifier is presented via the display of the latch responsive to non-actuation of the at least one of the switch or the sensor.

* * * * *